June 28, 1960     W. S. EASON     2,942,897
FASTENING DEVICE
Filed Dec. 10, 1957

INVENTOR.
WINFIELD S. EASON
BY
*Lyon & Lyon*
ATTORNEYS

United States Patent Office 2,942,897
Patented June 28, 1960

2,942,897

FASTENING DEVICE

Winfield S. Eason, Montrose, Calif., assignor to The Eon Corporation, Los Angeles, Calif., a corporation of California Filed Dec. 10, 1957, Ser. No. 701,781

1 Claim. (Cl. 287—20.5)

This invention relates to fastening devices, more particularly to fastening devices adapted to secure airplane passenger seats or other equipment to the floor or walls of an airplane, and included in the objects of this invention are:

First, to provide a fastening device of this type which, when in its latching position, is positively locked to resist loads imposed from any direction, that is, to withstand axial, lateral, or bending loads, and, when used in pairs or more, to resist torsional loads applied to the passenger seat or other equipment to which the device is attached.

Second, to provide a fastening device of this type wherein the parts of the fastening device are locked in their latching position by an auxiliary latch to prevent accidental dislodgment.

Third, to provide a fastening device of this type which may be made particularly compact without sacrificing its capability to withstand excessive loads; thus providing a device particularly suited for the excessive loads imposed in the maneuvering or in the rough landing of aircraft.

Fourth, to provide a fastening device of this class wherein when the parts are in their released position they tend to remain in a released position against accidental dislodgment, so that equipment provided with the fastening devices may be handled or set in place without troublesome accidental latching of the devices.

With the above and other objects in view, as may appear hereinafter, reference is directed to the accompanying drawings in which.

Figure 1:
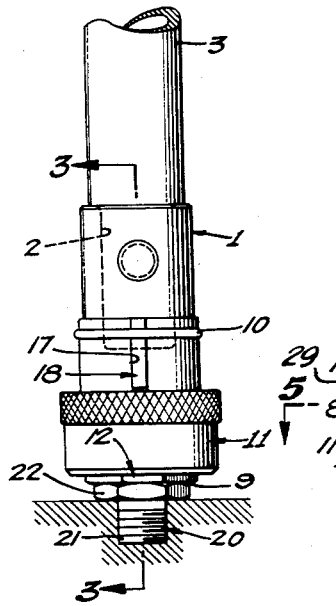
Figure 1 is a side view of the fastening device showing the device in its latched position secured to a stud mounted in an underlying structure, and indicating fragmentarily a post secured in position by the fastening device.

The fastening device includes a cylindrical body member 1 having a mounting socket 2 in its upper end to receive a post 3 which may be the leg of a passenger seat in an aircraft. The post is riveted or otherwise secured to the body member 1. The upper end of the body member may be modified for attachment to devices of various shapes which it is desired to secure.

The lower end of the body member 1 is provided with a shallow recess 4. The side walls of the body member adjacent its lower end are provided with four equally spaced longitudinal channels 5. These channels intersect the side walls of the shallow recess 4 so as to divide the side walls into segments 6. The ends of the channels 5 inward from the axial end of the body member 1 are deepened to form side recesses 7. The axially outer sides of the side recesses 7 form fulcrum shoulders 8. The external extremities of the segmental walls 6 are provided with complementary stop flanges 9.

At its midportion the body member 1 is provided with an annular groove which receives a stop ring 10. Slidably mounted between the stop ring 10 and the flanges 9 is a latching sleeve 11. The latching sleeve overrides the channels 5.

Fitted within each channel 5 is a latch member 12 in the form of a short bar having radially inturned end fingers 13 and 14. The end fingers 13 fit into the side recesses 7 and are shaped so that the latch members 12 have limited pivotal movement between the position shown in Fig. 3 and the position shown in Fig. 4. The end fingers 14 project into the shallow recess 4 and are movable between a position within the recess, as shown in Fig. 3, and a position between the segmental walls 6, as shown in Fig. 4.

Figures 3, 4:
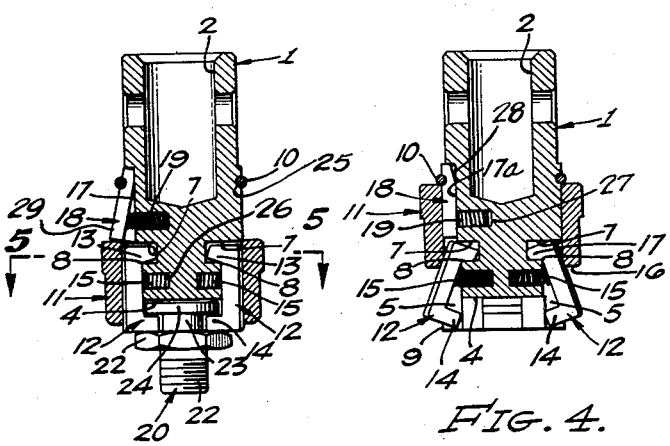
Fig. 3 is a longitudinal sectional view through 3—3 of Fig. 1, showing the fastening device in its closed or latching position.
Fig. 4 is a longitudinal sectional view thereof taken through 4—4 of Fig. 2, showing the latching device in its open position.
Figure 2:
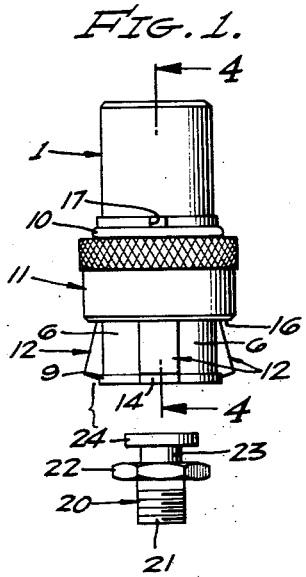
Fig. 2 is a side view of the fastening device and mounting stud with the fastening device in its open position.
Figure 5:
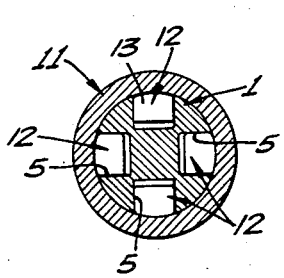
Fig. 5 is a transverse sectional view through 5—5 of Fig. 3.
Figure 6:
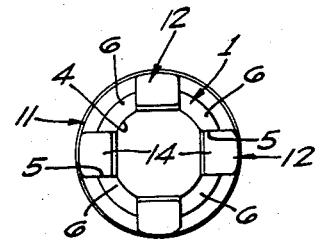
Fig. 6 is an end view of the fastening device shown in its open position.
Figure 7:
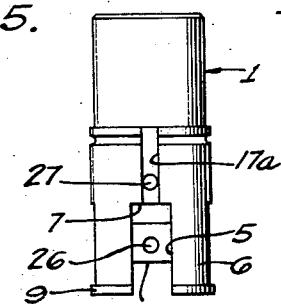
Fig. 7 is a side view of the body member of the fastening device.

Each latch member 12 is backed by a spring 15 set within a socket formed in the body member 1 so that the latch members are urged outwardly toward the position shown in Figs. 2, 4, and 6. The latching sleeve 11, when in its lower position shown in Figs. 1 and 3, holds the latch members 12 in their inner position. When the latching sleeve 11 is raised to its upper position shown in Figs. 2 and 4, the latch members 12 are permitted to pivot outwardly from each other under the urge of the springs 15.

It will be observed that when the latching sleeve 11 is in its upper position a lower margin 16 of the latching sleeve is approximately opposite but slightly below the fulcrum shoulders 8. As a consequence, outward movement of the latch members 12 is limited by the latching sleeve 11.

Furthermore, by reason of the fact that the lower margin 16 of the latching sleeve 11 is close to the fulcrum axes of the latch members 12, greater force is required to initiate downward movement of the latching sleeve than is required once the latch members are moved inward. This force need not be substantial, however, but is merely sufficient to resist accidental dislodgment of the latching sleeve 11 from its upper position, so that in the course of manipulating aircraft passenger seats or other objects equipped with the fastening devices the fastening devices remain in their open position until it is desired to latch or close the latch members 12.

In order to prevent accidental raising of the latching sleeve 11 from its lower position shown in Figs. 1 and 3, the body member 1 is provided with a longitudinal groove 17 above one of the channels 5. This groove receives a catch bar 18 which is notched near one end to fit under and be retained by the stop ring 10.

The catch bar 18 is of sufficient length to clear the upper margin of the latching sleeve 11 when the latching sleeve is in its lower position. The catch bar is urged outward to its sleeve-retaining position by means of a spring 19 set within a socket formed within the body member 1. The upper end of the catch bar 18 projects above the stop ring 10 and is so shaped as to limit its outward movement under urge of the spring 19.

The fastening device is adapted to engage a stud member 20 having a screw-threaded shank 21. The shank is provided with a flange 22 which may be hexagonal to receive a wrench. Above the flange 22 the stud member 20 forms a neck 23 of reduced diameter and an enlarged flat head 24. The neck 23 is dimensioned to fit with some degree of tolerance between the end fingers 14 of the latch members 12 when the latch members are in their closed position, such as shown in Fig. 3. The head 24 fits within the shallow recess 4 between the end fingers 14 and the closed side of the recess.

Operation of the fastening device is as follows:

The stud members 20 are secured in appropriate positions in the floor, walls, or ceiling of a structure to which various devices or apparatus are intended to be fastened. A fastening device is located on such apparatus at an appropriate place for engagement with a corresponding stud member. Initially, the latching sleeve 11 of each fastening device is in its raised position, such as shown in Figs. 2, 4, and 6. The latch members 12 are thus in their expanded or open position so that the head 24 of a corresponding stud member 20 may enter the shallow recess 4. Thereupon the latching sleeve 11 is moved downwardly or toward the shallow recess 4 to force the latch members 12 inwardly so that the end fingers 14 engage under the head 24 of the stud member 20. The catch bar 18 retains the latching sleeve 11 in position against accidental dislodgment. To release the latching device, it is merely necessary to press inward on the catch bar 18 and draw upwardly on the latching sleeve 11.

While a particular embodiment of this invention has been shown and described, it is not intended to limit the same to the exact details of the construction set forth, and it embraces such changes, modifications, and equivalents of the parts and their formation and arrangement as come within the purview of the appended claim.

What is claimed is:

A fastener device adapted to engage the head of an anchor stud, said device comprising a cylindrical body having a socket in one end thereof and longitudinal channels intersecting said socket and extending axially along the body beyond said socket, said socket being receptive of the stud head and said channels each having a radial recess at the end thereof opposite to the socket; a plurality of longitudinal latch members, one in each said channel and each member being provided at one end with an inreaching finger residing in and having pivotal engagement with the recess of each respective channel, the opposite end of each latch member being provided with an inreaching hook; a plurality of radial springs carried by the body, one for each latch member and directed to engage the latch members to bias the same angularly outward around the pivotal engagement of the fingers and recesses to withdraw the hooks from the socket; a sleeve slidable on the body between a retracted position overlying the ends of said channels and the finger ends of the latch members to retain the latter in their recesses and an extended position substantially covering the latch members and pressing said members inwardly against the bias of the mentioned springs to position the hooks of said members into engagement beneath the head of an anchor stud in the socket, the slidable sleeve having an axial length substantially equalling the length of the latch members; a manually releasable member housed in a groove of the body axially beyond the longitudinal recesses thereof and biased outwardly to overstanding abutment engagement between an end of said groove and the adjacent end of the sleeve when the latter is extended, thereby positively holding the sleeve against retraction and the hook on the latch members securely engaged with the mentioned head until said releasable member is manually retracted into its groove, and a stop member formed on the outside surface near the top of the manually releasable member which engages the slidable sleeve when in its retracted position so that the lower end of the sleeve will retain the inreaching fingers of the latch members in the radial recesses of the channels formed in the cylindrical body.

References Cited in the file of this patent

UNITED STATES PATENTS

| Number | Name | Date |
|---|---|---|
| 342,643 | Sellman | May 25, 1886 |
| 361,693 | Guild | Apr. 26, 1887 |
| 1,716,131 | Hodgson | June 4, 1929 |
| 1,815,660 | Walker | July 21, 1931 |
| 2,288,776 | Bodendieck | July 7, 1942 |
| 2,448,817 | McArthur | Sept. 7, 1948 |
| 2,614,781 | Engel | Oct. 21, 1952 |
| 2,654,135 | Grizzard et al. | Oct. 6, 1953 |
| 2,739,361 | Elsner | Mar. 27, 1956 |
| 2,742,307 | Elsner | Apr. 17, 1956 |
| 2,759,364 | Lewis | Aug. 21, 1956 |